Jan. 6, 1931.                    W. B. MATHEWSON                    1,787,751
                                  GREASE DISPENSER
                                Filed March 30, 1929
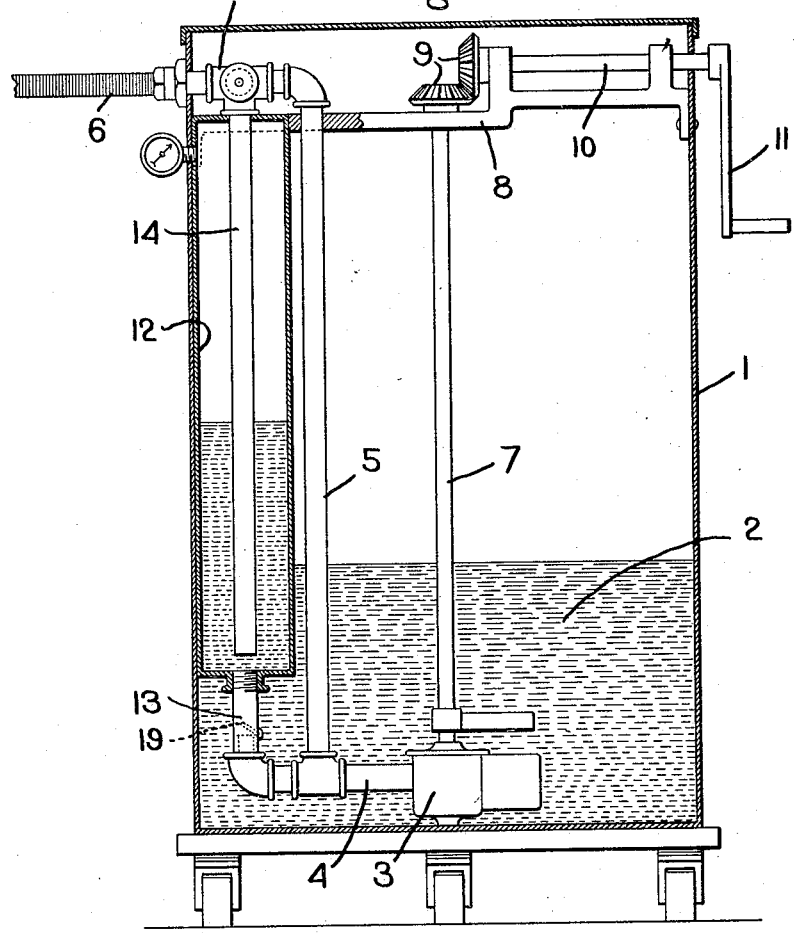
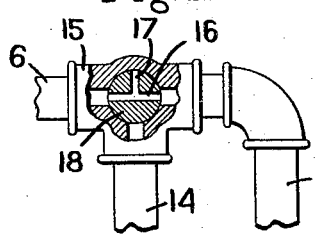 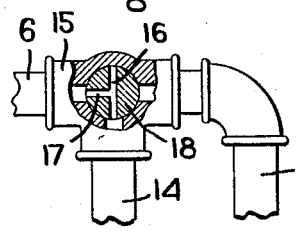 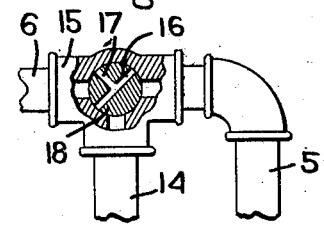
Inventor.
Wilfred B. Mathewson
by Heard Smith & Tennant.
Attys.

Patented Jan. 6, 1931

1,787,751

UNITED STATES PATENT OFFICE

WILFRED B. MATHEWSON, OF NORTH WEYMOUTH, MASSACHUSETTS

GREASE DISPENSER

Application filed March 30, 1929. Serial No. 351,340.

This invention relates to grease dispensers and has for its object to provide a novel grease dispenser adapted to deliver grease either at a moderate pressure or under high pressure. In the greasing of an automobile there are certain bearings, such for instance as spring shackles, steering knuckles, etc. that require a relatively small amount of lubricant but require high pressure service to effect proper lubrication. At other places, however, such as the transmission or differential, a relatively large amount of lubricant is required but high pressure delivery of the lubricant is not necessary. At such places a delivery of a larger quantity of lubricant under low pressure is desirable.

It is one of the objects of the present invention to provide a grease container having a single delivery pipe and constructed so that it contains a quantity of grease under high pressure which may be delivered from the delivery pipe for lubricating spring shackles, steering knuckles, and similar bearings, and which also is constructed so that by operating a suitable pump a relatively large quantity of grease can be delivered from said delivery pipe at a lower pressure for lubricating transmissions, differentials, etc.

In accordance with my invention I provide a main grease dispenser having within it an auxiliary high pressure container and I also provide a delivery pipe and a pump within the main container for delivering grease through the delivery pipe under low pressure. Provision is also made whereby this pump can be used for pumping grease into the auxiliary or high pressure container until the required high pressure is developed therein. The auxiliary tank is shown as partially filled with air so that when its outlet is closed and grease is pumped into it the air will be compressed and thus a high pressure developed therein.

The delivery pipe is further provided with a branch leading to the high pressure chamber with a suitable valve arrangement so that by properly manipulating the valve the grease may be delivered either from the high pressure container under the high pressure therein or from the main container by the operation of the pump.

In order to give an understanding of the invention I have illustrated in the drawings a selected embodiment thereof which will now be described after which the novel features will be pointed out in the appended claims.

Fig. 1 is a vertical sectional view of a grease container embodying my invention;

Fig. 2, 3 and 4 are views illustrating the controlling valves, said view showing the valve in different positions.

In the drawings 1 indicates a tank or container adapted to contain grease or other lubricant 2. Situated in this tank is a pump device 3, the delivery end of which is connected by pipes 4 and 5 to a flexible delivery pipe 6.

The pump may be operated in any suitable way depending on the character of the pump. The pump herein shown is of the gear type and is actuated from a vertical shaft 7 which has bearing at its upper end in a bracket member 8 extending across the container 1. This shaft 7 is connected by bevelled gears 9 to a crank 10 provided with a handle 11 situated outside of the container and by which it may be operated.

Situated within the tank or container 1 is a high pressure container 12. This container is connected at its lower end to the pipe 4 by means of the pipe connections 13 which has therein a check valve 19 arranged to permit grease to flow into the tank 12 but adapted to prevent backward movement of the grease. Said high pressure container 12 also communicates with the delivery pipe 6 through a pipe 14 which terminates at its lower end adjacent the bottom of the container 12 and at its upper end connects with the pipe 6 through a valve device 15. This valve device is a three-way valve adapted to control the delivery of grease either from the pipe 14 or from the pipe 5.

A valve suitable for this purpose is shown in Figs. 2, 3 and 4 and it comprises a valve plug 18 operating in the valve casing 15 and having a through-and-through port 16 and also a connecting port 17. When the valve is in the position shown in Fig. 2 the communication between the pipe 14 and the delivery pipe 6 will be closed but the communication between the pipe 5 and the pipe 6 will be open through the port 16. When the valve is turned in the position shown in Fig. 3 communication between the pipe 5 and the delivery pipe 6 is closed but the pipe 14 communicates with the pipe 6 through the ports 16 and 17. When the valve is in the position shown in Fig. 4 the communication between both pipes 14 and 5 and the delivery pipe 6 is closed.

The high pressure chamber is closed and in the use of the device the operator will first turn the valve plug 18 into the position shown in Fig. 4 thereby closing both the pipes 14 and 5 and then will operate the pump 3 to force grease into the auxiliary chamber 12. The pump 3 is to be of the type which will develop a high pressure, a gear pump being a well-known pump that will accomplish this purpose. As the pump is operated grease will be forced into the chamber 12 and the air which is in said chamber will be compressed thus building up a pressure therein. This operation may be continued until any desired pressure has been developed in the pressure chamber 12.

If it is desired to use the apparatus for lubricating spring shackles or other parts where high pressure grease service is desired then the delivery pipe 6 will be connected to the bearings to be lubricated and the valve plug 18 will be turned into the position shown in Fig. 3. The high pressure in the chamber 12 will force the grease or lubrication through the pipe 14 and pipe 6 and into the bearing.

The delivery pipe of a greasing apparatus of this type is frequently provided with a valve at its delivery end which controls the delivery of the grease so that by placing the valve plug 18 in the position shown in Fig. 3 and manipulating the valve at the delivery end of the delivery pipe 6 the grease under the high pressure will be forced into the bearings.

When it is desired to deliver grease to the transmission, differential or other places where the high pressure is not necessary then the valve will be turned into the position shown in Fig. 2 thus shutting off the high pressure delivery pipe 14 and establishing communication directly between the delivery pipe 6 and the pump 3. The pump 3 may then be operated to deliver the grease in larger quantities through the pipe 5 and delivery pipe 6. During this operation the check valve 19 prevents the grease in the auxiliary chamber 12 from being forced back into the pipe 5.

With this device, therefore, the operator always has at his command a quantity of grease ready to be delivered at high pressure by simply manipulating the valve plug 18 and he also has at his command a large quantity of grease for delivery under ordinary pressure by the operation of the pump 3.

I claim:

1. A grease dispenser comprising a main tank, an auxiliary high pressure tank within the main tank, a delivery pipe, a pump in the main tank, pipe connections between the discharge of the pump and both the high pressure tank and the delivery pipe, a check valve in the pipe connection leading to the high pressure tank, a valve which in one position establishes communication between the delivery pipe and the high pressure tank, in another position establishes communication between said delivery pipe and the discharge of the pump and in a third position closes both communications, whereby when both communications are closed and the pump is operated, grease will be pumped into the high pressure tank and build up a pressure therein and when the high pressure tank is in communication with the delivery pipe grease may be delivered therethrough under high pressure without operating the pump while when the discharge of the pump is in communication with the delivery pipe the pump may be used for delivering grease directly to said pipe.

2. A grease dispenser comprising a main tank to contain grease, an auxiliary high pressure tank within the main tank, a pump by which grease from the main tank may be pumped into the auxiliary high pressure tank and thereby develop a high pressure therein, means between the high pressure tank and the pump to prevent a back flow of grease from the tank to the pump, a delivery pipe, and means for connecting the delivery pipe either to the high pressure tank or to the discharge of the pump, whereby grease may be delivered to the delivery pipe either from the high pressure tank under high pressure or directly from the pump.

In testimony whereof, I have signed my name to this specification.

WILFRED B. MATHEWSON.